United States Patent
Avery et al.

(10) Patent No.: US 8,204,990 B1
(45) Date of Patent: Jun. 19, 2012

(54) POWER CYCLER WITH INTERNET CONNECTIVITY MONITOR

(76) Inventors: James Avery, Annandale, VA (US); Maurice Clyde Avery, Williamsburg, VA (US)

( * ) Notice: Subject to any disclaimer, the term of this patent is extended or adjusted under 35 U.S.C. 154(b) by 0 days.

(21) Appl. No.: 13/267,073

(22) Filed: Oct. 6, 2011

(51) Int. Cl.
*G06F 15/173* (2006.01)
*H02J 3/00* (2006.01)
*H02B 1/24* (2006.01)

(52) U.S. Cl. .................. 709/224; 307/85; 307/112
(58) Field of Classification Search .......... 709/224; 307/85, 66, 112
See application file for complete search history.

(56) References Cited

U.S. PATENT DOCUMENTS

| 6,700,351 | B2 * | 3/2004 | Blair et al. | 320/125 |
| 7,680,561 | B2 * | 3/2010 | Rodgers et al. | 700/295 |
| 2005/0206241 | A1 * | 9/2005 | Saxena et al. | 307/66 |
| 2009/0193118 | A1 * | 7/2009 | Cox et al. | 709/224 |
| 2010/0150040 | A1 * | 6/2010 | Huang | 370/311 |
| 2011/0175448 | A1 * | 7/2011 | Engler et al. | 307/38 |

* cited by examiner

*Primary Examiner* — Asghar Bilgrami
(74) *Attorney, Agent, or Firm* — David Quinn

(57) ABSTRACT

A power cycler apparatus monitors a computer network for internet connectivity and cycles the power to connected networking devices when a loss of internet connectivity is detected. The power cycler may comprise remote power switches for resetting power to networking devices in remote locations. The power cycler may comprise a manual reset button for manually triggering a power reset cycle, which may be connected via a wired or wireless connection. The power cycler may restore power to the power outputs in a staggered fashion to allow each connected network device time to initialize before the next network device is powered on. The power cycler may feature a battery backup or uninterruptible power supply.

16 Claims, 8 Drawing Sheets

POWER CYCLER WITH INTERNET CONNECTIVITY MONITOR

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

BACKGROUND

I. Field

This invention relates to networking and power management devices.

II. Background

Many individuals connect to the internet through use of a modem and, optionally, a router. Regardless of the type of input signal (e.g., cable, DSL, fiber optic), the equipment loses connectivity from time to time. Typically, one of the first steps in troubleshooting a loss in internet connectivity is to reset power to the modem, router, or both. If a device following a voice-over-internet-protocol ("VOIP") is present, its power is sometimes also cycled with the modem and router. While resetting power may be a simple measure in some circumstances, it can be tedious and inconvenient. For users whose devices are installed in inconvenient locations (e.g. utility closets, attic spaces), manually resetting the power to such devices can be time consuming and difficult. Further, the several devices which need to be reset may not be in close physical proximity. Instead, some network environments involve a modem, a router, and one or more wireless bridges, network expansion devices, or repeater devices, all of which may be physically located hundreds of feet from one another.

Often, internet connectivity may be restored by simply terminating and subsequently restoring power. Cycling the power to networking devices allows them to perform a power-on reset. Customer support technicians sometimes instruct the user to restore power to the modem and router in a staggered fashion. For example, instructions to restore power to the router thirty seconds after restoring power to the modem. This power sequencing is often performed in order to give the modem time to acquire an IP address from the Internet Service Provider ("ISP") before the router is powered on.

Losses of internet connectivity can occur at any time of the day or night, which may interrupt or delay file transfers or other on-going internet services. For remote installations, resetting the power may require a costly service call from a technician.

There is a need for a device capable of cycling the power to several networking devices in a sequential, delayed manner. There is also a need for a device capable of doing so responsive to detection of a loss of connectivity while monitoring internet connectivity. There is also a need for a device capable of performing these functions in network environments involving physically distant networking devices.

SUMMARY

The above problems, and others, are reduced by the power cycler with internet connectivity monitor as herein described and shown.

An object of an exemplary embodiment of the present invention is to provide a power cycler with internet connectivity monitor (the "Power Cycler"). The Power Cycler is a device with one or more power outputs capable of cycling the power to one or more networking devices in a time-sequenced manner. The duration of the delay before power is restored to any device may be configurable by the user, as may be the duration of the delay between restoring power to each device. The Power Cycler may space outputs sufficiently far apart to accommodate plugs with integrated power adapters. For the same purpose, it may alternatively use outputs on short leads or flexible extensions.

An object of an exemplary embodiment of the present invention is to provide a Power Cycler capable of monitoring internet connectivity in a network environment. It may connect to the network via a wired or wireless connection following any number of protocols. It is also capable of cycling the power to connected devices responsive to the detection of a loss of internet connectivity. A loss of internet connectivity may be detected by monitoring a connection between the local network and a remote server. Such monitoring may include periodically sending a ping message to a remote server and monitoring for a reply. If a reply is detected, internet connectivity is present and has not been lost. The network environment may connect to the internet using any of a number of known protocols, mediums, or connection types.

Other systems, methods, and/or products according to embodiments will be or become apparent to one with skill in the art upon review of the following drawings, and further description. It is intended that all such additional systems, methods, and/or products be included within this description, be within the scope of the present invention, and be protected by the accompanying claims.

BRIEF DESCRIPTION OF THE DRAWINGS

The above and other exemplary embodiments, objects, uses, advantages, and novel features are more clearly understood by reference to the following description taken in connection with the accompanying figures wherein.

DETAILED DESCRIPTION

The word "exemplary" is used herein to mean "serving as an example, instance, or illustration." Any configuration or design described herein as "exemplary" is not necessarily to be construed as preferred or advantageous over other configurations or designs.

This invention now will be described more fully hereinafter with reference to the accompanying drawings, in which exemplary embodiments are shown. This invention may, however, be embodied in many different forms and should not be construed as limited to the embodiments set forth herein. Moreover, all statements herein reciting embodiments of the invention, as well as specific examples thereof, are intended to encompass both structural and functional equivalents thereof.

Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or perspective views illustrating some of this invention. The functions of the various elements shown in the figures may vary in shape, attachment, size, and other physical features. Those of ordinary skill in the art further understand that the exemplary systems, and/or methods described herein are for illustrative purposes and, thus, are not intended to be limited to any particular named manufacturer or other relevant physical limitation (e.g., material).

Figure 1:
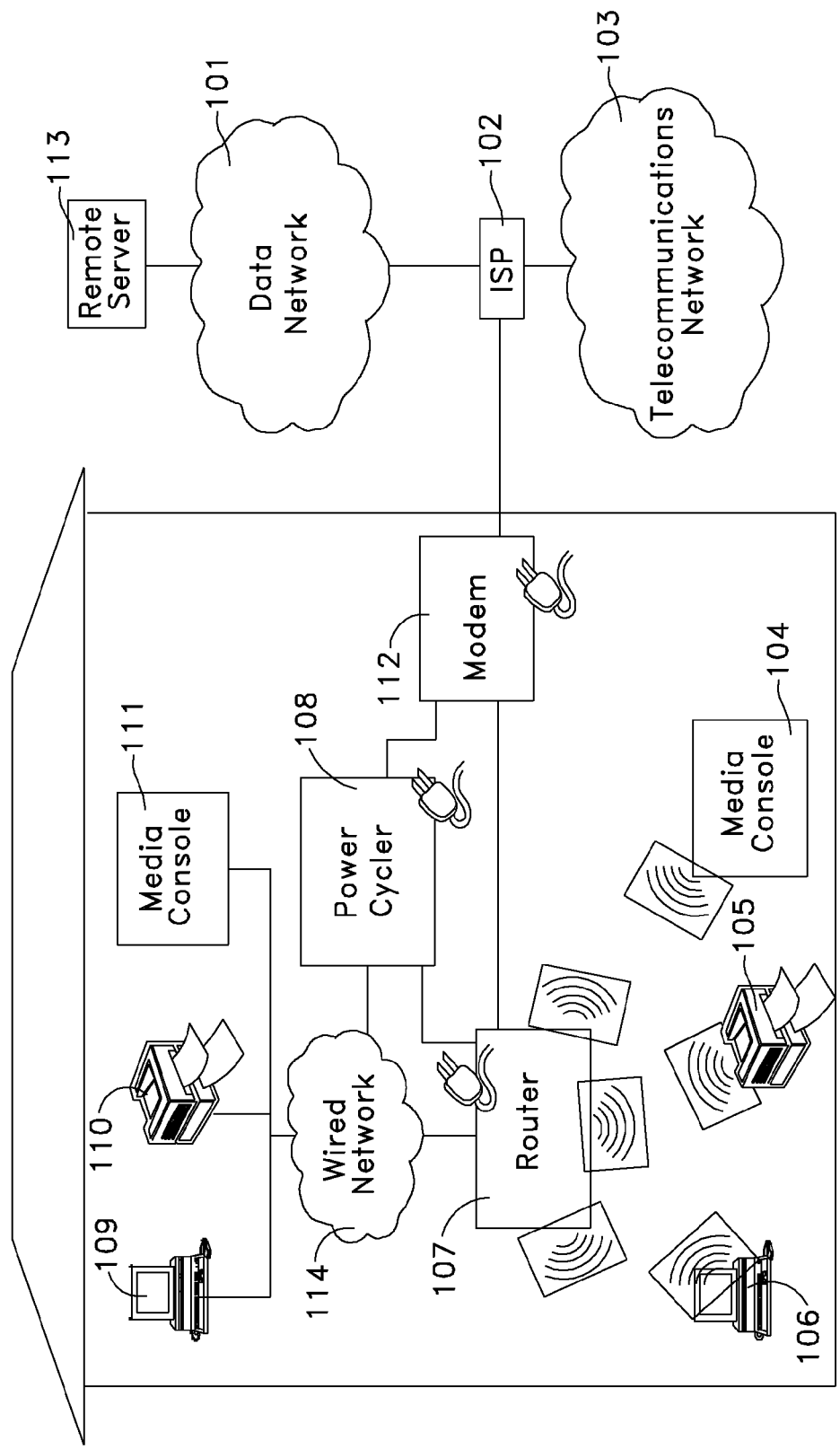
FIG. 1 is a block diagram of a network environment implementing an exemplary network system with internet connectivity in accordance with some exemplary embodiments of the present invention.

FIG. 1 depicts an exemplary home network environment. Devices are connected to the internet via a modem 112 and router 107. The modem 112 receives an incoming signal from Internet Service Provider ("ISP") 102. The ISP 102 directs traffic from the modem 112 to the data network 101 and telecommunications network 103. Also connected to the data network is a remote server 113.

The router 107 may connect to networking devices via a wired or wireless connection. The wireless connection may follow any number of protocols, including IEEE 802.11 standards. Devices connected to the router 107 via a wired network 114 may include, for example, a console 111 for gaming or media, a printer 110, or a computer 109. Devices connected via a wireless connection may include, for example, a console 104 for media or gaming, a printer 105, or a computer 106.

The Power Cycler 108 creates a networked link to the wired network 114. The wired network 114 is a computer network formed by router 107. The modem 112 and the ISP 102 create a networked link between the router 107 and the ISP 102. Thus, the wired network 114 has network connectivity to the remote server 113.

The Power Cycler 108 is capable of monitoring internet connectivity by sending internet control message protocol echo request packets to the remote server 113 and measuring the round-trip time. While monitoring the connection of the wired network 114 to the remote server 113 the Power Cycler 108 will initiate a power reset cycle to the power outputs if the Power Cycler 108 detects that the wired network 114 no longer has network connectivity to the remote server 113. Sending the packets is called "pinging" or a "ping" and the round-trip time is the "ping value." The ping value is tested to determine if the internet connection has been lost. For example, if any individual ping value exceeds a certain threshold or if the ping is not returned within a certain time, the ping may be deemed to have failed. Multiple pings may be tested as a group, such as by taking an average ping value or other metric. Internet connectivity may be deemed absent when the average ping value exceeds a pre-set threshold, if any individual ping value exceeds a pre-set threshold, or by a variety of other tests. The thresholds against which the average ping value and individual ping value are compared may be equivalent or different from one another. Other measures or metrics may be implemented in accordance with industry practices as recognized by one of ordinary skill the art would recognize.

In this exemplary embodiment, the Power Cycler 108 is connected to the router 107 and the modem 112 via power connectors. Thus, in this embodiment, the router 107 and the modem 112 do not have an independent source of power, but receive electrical power through the Power Cycler 108. Alternatively, the Power Cycler 108 may control the flow of power to the router 107 and the modem 112 by sending a reset signal to each the router 107 and the modem 112, which are configured to initiate a power reset responsive to receiving the reset signal.

Internet connectivity may be absent due to a malfunction of the modem 112, a malfunction of the router 107, or from another source. The Power Cycler 108, responsive to detecting a loss in internet connectivity, will trigger a power reset cycle, discussed more fully in FIG. 3 and the accompanying discussion, below.

The Power Cycler 108 may feature a battery backup or uninterruptible power supply ("UPS"). The UPS may be integrated into the Power Cycler 108 or may be in a separate housing. The UPS is configured to supply power from a battery if the external power supply ceases to provide power. This may occur if there is a failure in the power grid or if the power input is disconnected from the power supply, such as if the user unplugs the Power Cycler 108 from a wall outlet.

Figure 2:
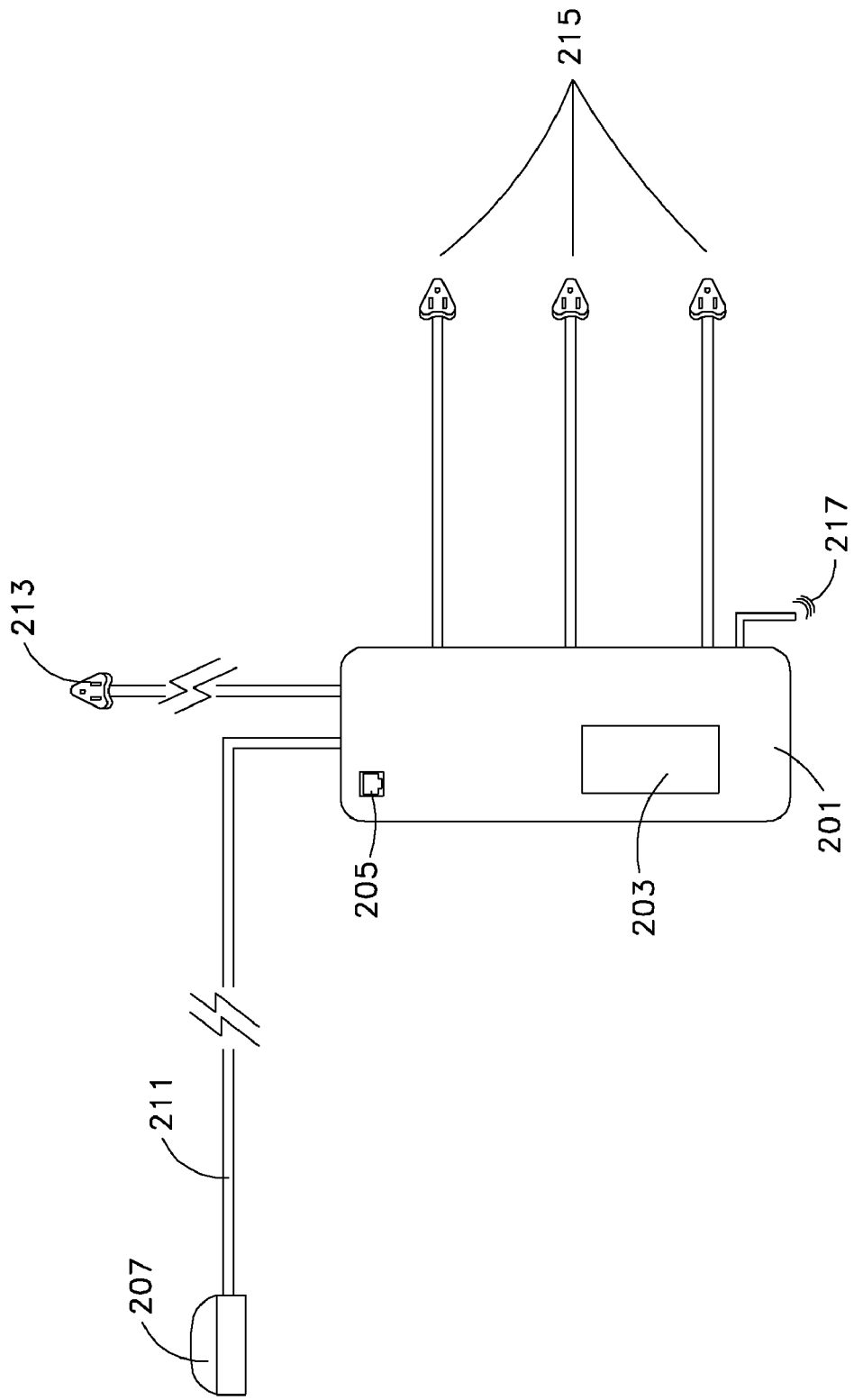
FIG. 2 is a top view of an exemplary embodiment of the present invention in accordance with some exemplary embodiments of the present invention.

FIG. 2 depicts an exemplary embodiment of the Power Cycler 201. The Power Cycler 201 has a port 205 to communicate via Ethernet or a similar standard. The Power Cycler 201 may have a Network Integrated Controller ("NIC") connected to the port 205. The NIC may be configured to utilize wired communications, wireless communications, or both. The Power Cycler 201 may connect to a networking device via a wired connection using a wired NIC. The Power Cycler 201 may connect to a networking device via a wireless connection using a wireless NIC. The Power Cycler 201 comprises a housing from which power input 213 and power outputs 215 extend.

The Power Cycler 201 draws power from an outlet via a power input 213. The Power Cycler 201 distributes power via power outputs 215. The power outputs 215 may be labeled with writing, distinct coloration, or otherwise marked to suggest to the user that the user should connect the power outputs 215 to networking devices. The marking may suggest connecting particular networking devices to particular power outputs 215. For example, one of the power outputs 215 may be labeled as corresponding to a modem, another may be labeled as corresponding to a router, and another may be labeled as corresponding to a VoIP device. The power outputs 215 may be labeled with writing, distinct coloration, or otherwise marked in a way to distinguish one from another. For example, the power outputs 215 may be numbered or marked with color unique as against the other power outputs 215.

The power outputs 215 may comprise short leads or extension cords extending from the housing of the Power Cycler 201 so that the power outputs 215 may accommodate large or differently sized plugs. Further, the power outputs 215 may be disposed upon the housing of the Power Cycler 201 and spaced sufficiently far apart to accommodate a plug with an integrated power adapter.

The power input 213 power outputs 215 may be compatible with any of the standards set by the National Electrical Manufacturers Association. In an exemplary embodiment, the power input 213 includes a male plug for connecting to a female wall outlet in a typical residential or commercial setting and the power outputs 215 include female sockets for connecting to complementary male plugs of network or computing devices.

The Power Cycler 201 may be capable of monitoring internet connectivity. Port 205 is connected to a wired NIC. Antenna 217 is connected to a wireless NIC. The wired NIC and the wireless NIC may be a single unit. Using port 205, antenna 217, or both, the Power Cycler 201 can connect to a computer network through which it can monitor the connectivity of that network to the internet. FIG. 1 and the accompanying description discuss the internet monitoring feature in more detail. The NIC is disposed within the housing of Power Cycler 201.

The Power Cycler 201 may feature a status panel 203. The status panel 203 may feature indicators capable of indicating one or more of the following: whether the Power Cycler 201 is receiving power through the power input 213, whether Power Cycler 201 is connected to a computer network via wired port 205, whether Power Cycler 201 is connected to a computer network via antenna 217, whether internet connectivity is present or absent, whether power is flowing to each of the power outputs 215, or other types of status. The status panel 203 may indicate information about the UPS, if the Power Cycler 201 is so equipped. The UPS information may include the health of the battery, the battery's charge level, whether the battery is discharging to supply power to the power outputs 215, an estimation of how long the battery's charge will last while discharging, or whether the battery is charging using electrical power from the power inputs 213. The indicators of the status panel 203 may comprise lights, regions of a display, or devices serving a similar function.

Figure 3:
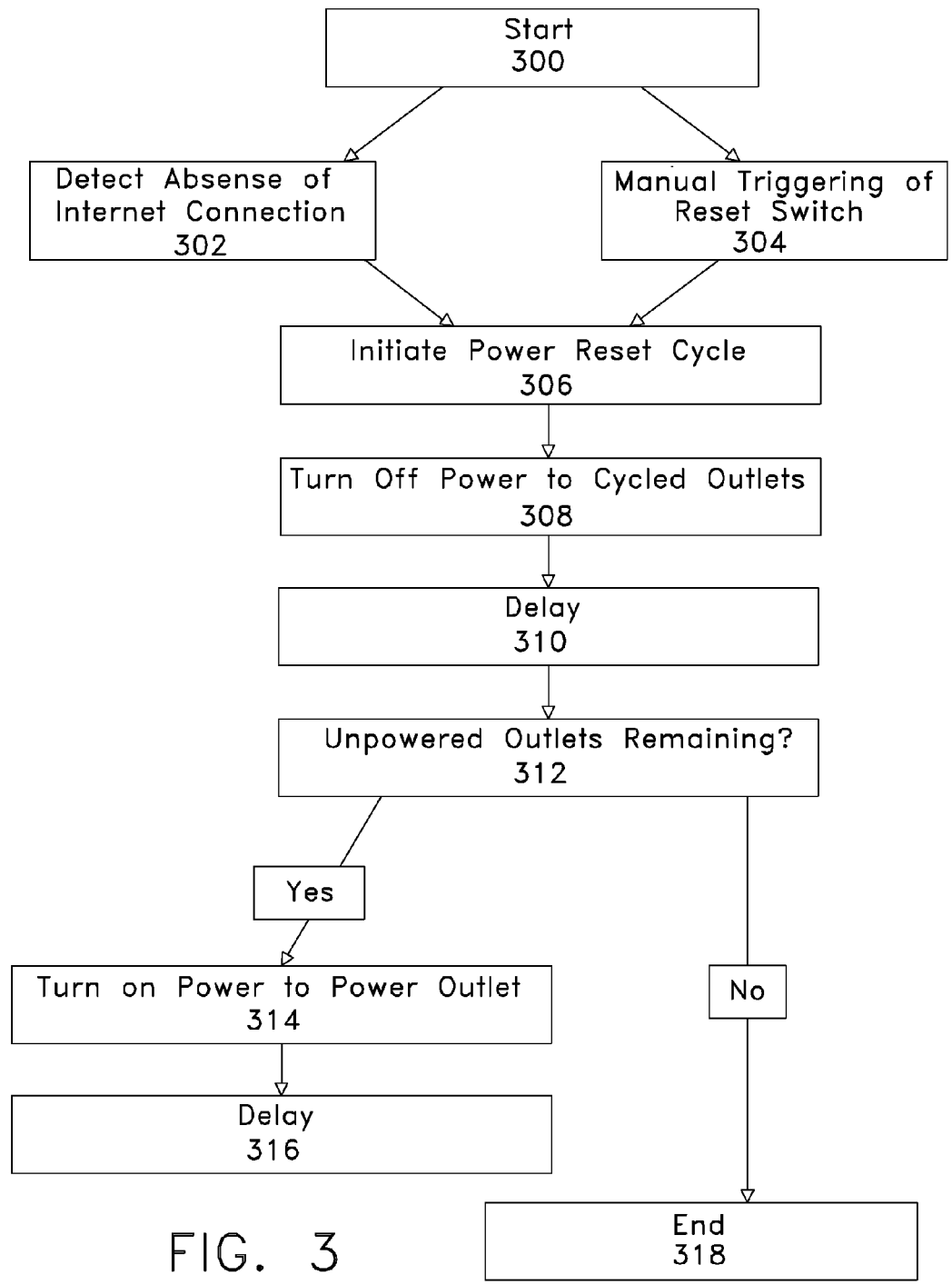
FIG. 3 is a flow chart of an exemplary power reset cycle in accordance with some exemplary embodiments of the present invention.

The Power Cycler 201 has a manual reset button 207. When pressed, the manual reset button 207 triggers a power reset cycle regardless of internet connectivity status. The manual reset button 207 may be connected to the Power Cycler 201 by a wired connection 211. FIG. 3 and the accompanying description discuss the power reset cycle feature in more detail.

The Power Cycler 201 features a central processor unit ("CPU") that is capable of governing the flow of power through each of the power outputs 215. The CPU is connected to the NIC, power input 213, power outputs 215, status panel 203, and manual reset button 207. The CPU receives a reset signal from the manual reset button 207 when the manual reset button 207 is activated. The CPU also generates a reset signal when it detects a loss of internet connectivity while monitoring the computer network through the NIC.

FIG. 3 depicts a flowchart of an exemplary power cycle process. The process begins at block 300. Either detecting an absence of internet connectivity 302 or manually triggering of the reset switch 304 can initiate a power reset cycle 306. Upon commencing the power reset cycle 306, power is turned off to all cycled outlets 308. When the cycled outputs are turned on, they are in an enabled state. When power it turned off to all cycled outlets 308, they enter a disabled state. The number of cycled outlets may vary from one embodiment to another. After turning off all outlets, power is restored in a time-sequenced manner. First, there is a time delay 310 during which all cycled outlets remain in the disabled state. The delay 310 may be user-configurable, pre-configured, or fixed. After the delay 310, the power cycle process determines whether unpowered outlets remain 312, which depends upon whether any power outputs remain in the disabled state. If unpowered outlets remain, power is restored to an outlet 314. A time delay 316 after turning on an outlet can be user-configurable, pre-configured, or fixed. If a network device such as a modem or router is connected to the outlet powered on in block 314, then the time delay 316 can allow time for the networking device (e.g., the modem or router) to initialize. After the time delay 316, the process determines if unpowered outlets remain 312. If so, the steps in block 314 and block 316 repeat. The time delay 316 may be the same or different duration for each occurrence of the time delay 316. Once no more outlets remain unpowered, all of the power outputs are in the enabled state, the process ends 318 and the power cycle is complete.

Figure 4:
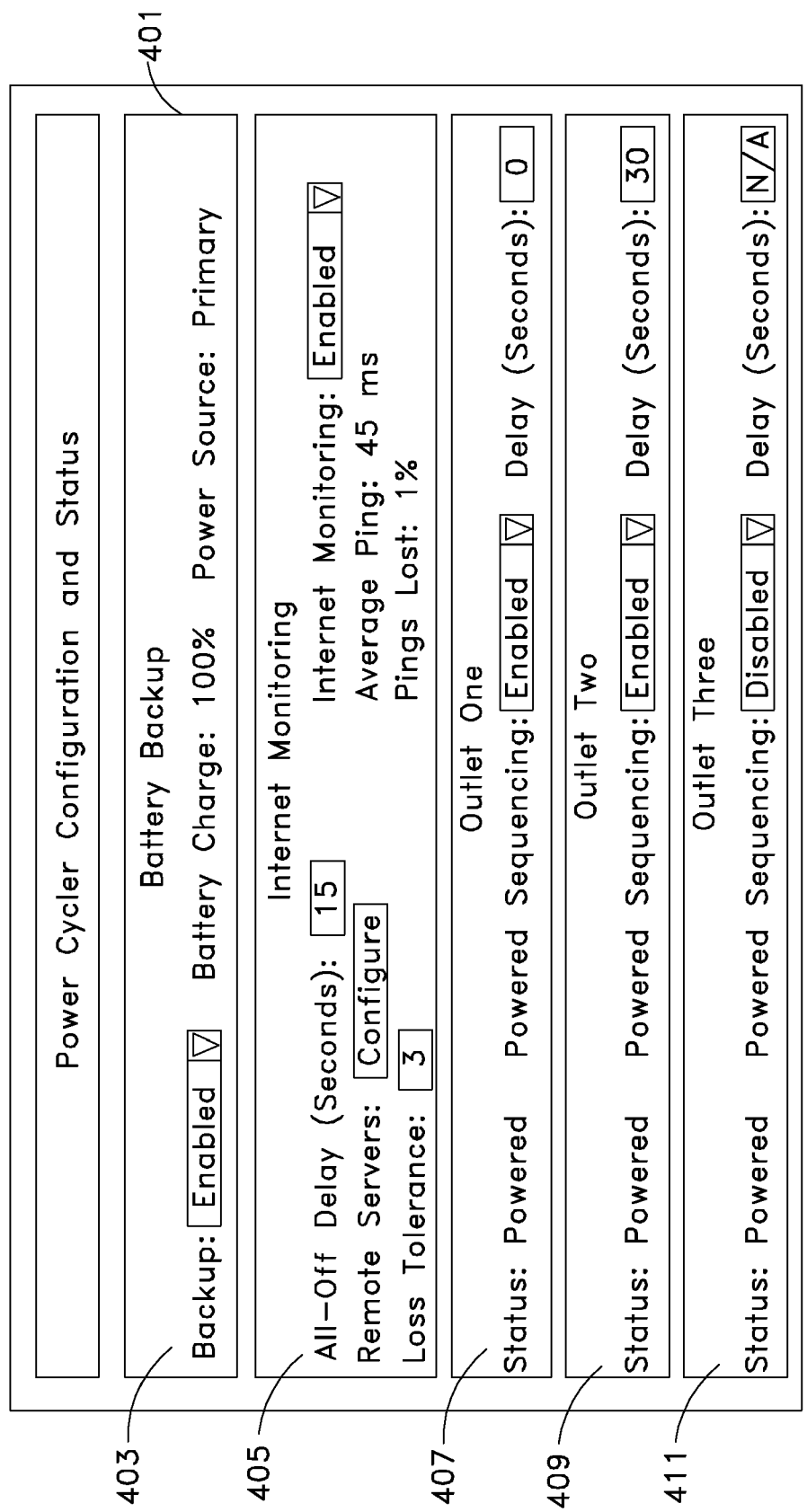
FIG. 4 is a block diagram of an exemplary configuration interface in accordance with some exemplary embodiments of the present invention.

FIG. 4 depicts an exemplary embodiment of the configuration interface for the Power Cycler. The configuration interface 401 comprises several regions. An optional battery backup configuration region 403 may include a configuration option to enable or disable the battery backup feature and status information showing the battery's charge level and the current power source. If the primary power supply fails, the battery backup will provide power. While the battery backup is providing power, the current power source status in the battery backup configuration region 403 will indicate that the power source is the battery backup rather than the primary power source. If the battery backup feature is disabled, the battery backup will not provide power if the primary power source fails.

The exemplary configuration interface 401 also includes an internet monitoring region 405. In the internet monitoring region 405, the user may configure the duration of the delay occurring during a power cycle in which all controlled outlets remain powered off. The user may also configure whether the internet monitoring feature is enabled or disabled along with the servers to ping. The servers may be configured on a separate screen accessible through a button in the internet monitoring region 405. Servers may be designated by a uniform resource locator (URL) or directly IP address. The internet monitoring region 405 also includes status information on the average ping value and the percentage of pings that fail (or are "lost"). The user may configure how many lost pings will be tolerated before the internet monitor triggers a reset cycle. If a tolerance of three is designated, for example, then the internet monitor will not trigger a power reset cycle until the four pings in a row fail. Alternatively, the tolerance levels may be configurable as relative measures such as "low" and "high" to provide a more user-friendly interface. The relative measures will correspond to more precise values such as the number of ping failures in a row to tolerate.

The exemplary configuration interface 401 also includes an outlet one region 407. The outlet one region 407 includes status information such as whether a first outlet is distributing power, is powered off and waiting on a configured delay, or is exhibiting a problem. The user may configure power sequencing to be enabled or disabled on a per-outlet basis. The user may configure a time delay for the first outlet. This time delay occurs after the all-off delay but before the first outlet begins distributing power. In an exemplary embodiment, the delay for outlet one is set to zero second, so outlet one begins distributing power immediately after the expiration of the all-off delay configured in the internet monitoring region 405.

The exemplary configuration interface 401 also includes an outlet two region 409. The outlet two region 409 includes status information such as whether a second outlet is distributing power, is powered off and waiting on a configured delay, or is exhibiting a problem. The user may configure power sequencing to be enabled or disabled on a per-outlet basis. The user may configure a time delay for the second outlet. This time delay occurs after the outlet one delay but before the second outlet begins distributing power. In an exemplary embodiment, the delay for outlet two is set to thirty seconds, so outlet two begins distributing power thirty seconds after the outlet one begins distributing power as configured in the outlet one region 407.

The exemplary configuration interface 401 also includes an outlet three region 411. The outlet three region 411 includes status information such as whether a second outlet is distributing power, is powered off and waiting on a configured delay, or is exhibiting a problem. The user may configure power sequencing to be enabled or disabled on a per-outlet basis. In the outlet three region 411 of the exemplary configuration interface 401, power sequencing is disabled for outlet three. Any outlet for which power sequencing is disabled will be exempt from the power reset cycle. When power sequencing is disabled, the delay value changes to "N/A" to indicate that the value is not applicable.

The power cycle will skip any outlet for which power sequencing is disabled. Thus, for example, if power sequencing is disabled for outlet one, but not for outlet two, and an all-off delay of thirty seconds is configured, outlet one will not be reset during a power cycle. Outlet two will cease distributing power for the sum of the all-off duration and the outlet two delay.

Figure 5:
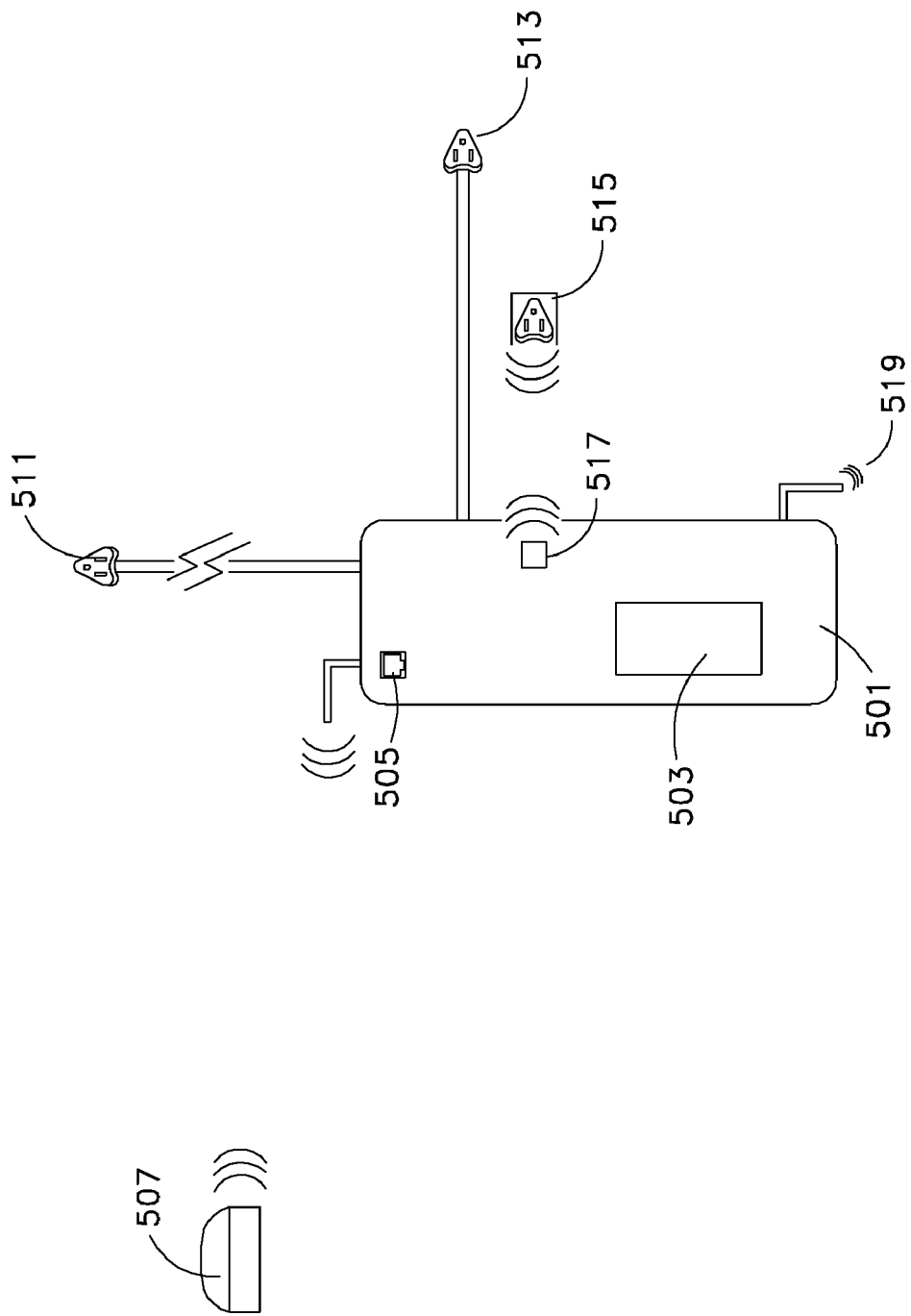
FIG. 5 is a top view in accordance with some exemplary embodiments of the present invention.

FIG. 5 depicts an exemplary embodiment with distributed power control. The Power Cycler 501 receives electrical power from power input 511 and distributes that power via power outputs 513. The Power Cycler 501 features remote switches 515. Remote switches 515 have both male and female power outlet connectors such that a device may plug into one of the remote switch 515, which may in turn plug into a power outlet. Thus, the remote switches 515 are capable of intercepting the flow of power from a power source and an electronic device. The remote switches 515 are configured to receive a wireless signal and, response to that signal, toggle the flow of power through the remote switch 515.

The Power Cycler 501 may trigger a power reset cycle response to internet connectivity being absent. Further, Power Cycler 501 may initiate a power reset cycle responsive to remote button 507 being activated. In an exemplary embodiment, during a power reset cycle, power flow is terminated to some or all of the power outputs 513 and remote switches 515 are signaled via transmitter 517 to interrupt the flow of power. The remote switches 515 may be switched on a timer in the same manner as any of the power outlets 502.

The Power Cycler 501 has a port 505 to communicate via Ethernet or a similar standard. The Power Cycler 501 may have a NIC connected to the port 505. The NIC may be configured to utilize wired communications, wireless communications, or both. The Power Cycler 501 may connect to a networking device via a wired connection using a wired NIC. The Power Cycler 201 may connect to a networking device via a wireless connection using a wireless NIC.

The Power Cycler 501 may be capable of monitoring internet connectivity. Port 505 may be connected to a wired NIC. Antenna 519 is connected to a wireless NIC. The wired NIC and the wireless NIC may be a single unit. Using port 505, antenna 519, or both, the Power Cycler 501 can connect to a computer network through which it can monitor the connectivity of that network to the internet. FIG. 1 and the accompanying description discuss the internet monitoring feature in more detail.

The Power Cycler 501 may feature a status panel 503. The status panel 503 may feature indicators capable of indicating one or more of the following: whether the Power Cycler 501 is receiving power through the power input 511, whether Power Cycler 501 is connected to a computer network via wired port 505, whether Power Cycler 501 is connected to a computer network via antenna 519, whether internet connectivity is present or absent, whether power is flowing to each of the power outputs 513, whether remote switch 515 is toggled to allow or disallow power flow, or other types of status. The status panel 503 may indicate information about the UPS, if the Power Cycler 501 is so equipped. The UPS information may include the health of the battery, the battery's charge level, whether the battery is discharging to supply power to the power outputs 513, an estimation of how long the battery's charge will last while discharging, or whether the battery is charging using electrical power from the power inputs 511. The indicators of the status panel 503 may comprise lights, regions of a display, or devices serving a similar function.

The manual reset button 507 may be connected to the Power Cycler 501 a wireless connection. The wireless connection may transmit on any of a variety of spectrums, for example, radio or infrared, or a variety of protocols, for example IEEE 802.11 or Bluetooth. When pressed, the manual reset button 507 triggers a power reset cycle regardless of internet connectivity status. FIG. 3 and the accompanying description discuss the power reset cycle feature in more detail.

The Power Cycler 501 features a central processor unit ("CPU") that is capable of governing the flow of power through each of the power outputs 513 and governing the remote switch 515 through transmitter 517. The CPU is connected to the NIC, power input 213, power outputs 215, status panel 203, manual reset button 207, and transmitter 517. The CPU receives a reset signal from the manual reset button 207 when the manual reset button 207 is activated. The CPU also generates a reset signal when it detects a loss of internet connectivity while monitoring the computer network through the NIC.

Figure 6:
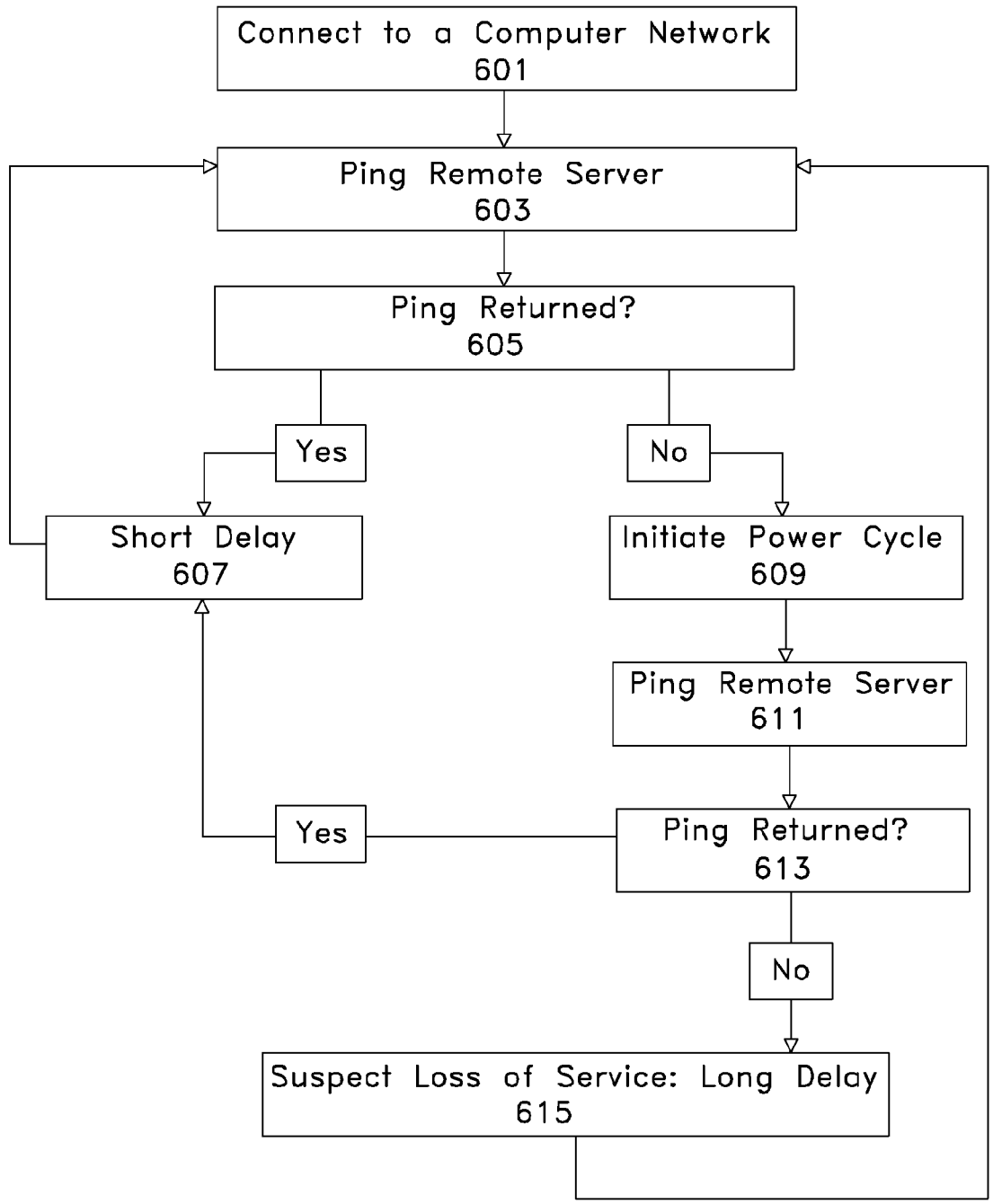
FIG. 6 illustrates a block diagram in accordance with some of the exemplary embodiments of the present invention.

FIG. 6 depicts the internet connectivity monitoring feature performed by the Power Cycler. First, the Power Cycler connects to a computer network 601 using a wired or wireless connection. The Power Cycler pings a remote server 603 through the computer network. The IP address of the remote server may be pre-set or user-configurable. The remote server may be the DNS server provided by the ISP.

Block 605 represents a decision based upon whether the ping sent in Block 603 returns in a timely fashion. The ping is deemed to have returned if the remote server responds within a certain time threshold. The time threshold may be pre-set or user-configurable. If the ping is returned, the Power Cycler delays for a short amount of time 607 before returning to block 603 to continue monitoring the network's connectivity. If the ping is not returned, the Power Cycler initiates a power cycle. This power cycle causes a power-on reset cycle for the modem and router if they are connected to the cycled power outputs. After the power cycle completes, the Power Cycler pings the remote server again 611.

Block 613 represents a decision based upon whether the ping sent in Block 611 returns in a timely fashion. The ping sent in Block 611 may be evaluated on the same or different criteria as those used for the ping sent in Block 603. If the ping sent in Block 613 is returned, the Power Cycler returns to Block 607. If the ping send in Block 613 is not returned, the Power Cycler a loss of service can be suspected. Such a loss of service may occur if the connection to the remote server is caused not by any local networking devices, but a failure in the equipment of the ISP or other factor, such as a damaged communications line outside the network environment. To prevent repeated but ultimately futile power cycling, the Power Cycler will delay longer if the ping following a power cycle fails to return. Thus, the Power Cycler will delay for a longer period of time 615, which may be pre-set or user-configurable. After the long delay 615, the Power Cycler continues monitoring the network connectivity by returning to block 605. In an exemplary embodiment, the short delay in Block 607 is three seconds while the long delay in Block 615 is sixty seconds.

The Power Cycler may ping the remote server more than once before it cycles power to the power outputs. It is possible that the time after a power cycle and before the first ping will be insufficient to allow the connected networking devices to re-initialize. If this is the case, the failure of the first ping to return in a timely fashion is indicative of the networking devices needing additional time, not of the computer network's connectivity or lack thereof. Thus, the Power Cycler may delay for a longer period of time after a power reset cycle before pinging, or it may send multiple pings with delays between each, even if the first fails, before repeating the power reset cycle.

Figure 7:
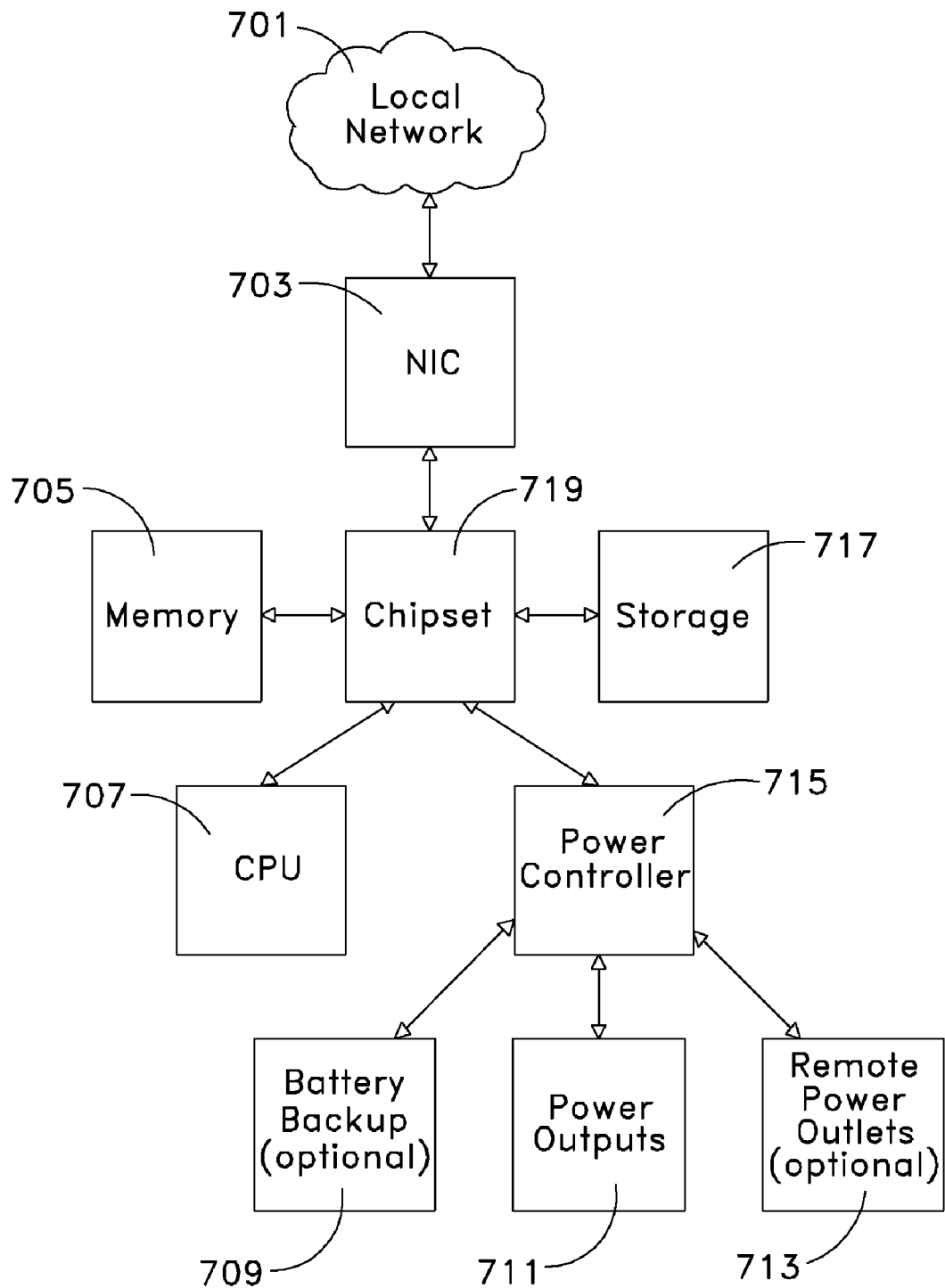
FIG. 7 illustrates a block diagram in accordance with some of the exemplary embodiments of the present invention.

FIG. 7 illustrates a block diagram in accordance with some of the exemplary embodiments of the present invention. Local network 701 comprises a network including at least one networking device (e.g., a modem or router). The local network 701 is connected to the NIC 703 via a networked link. The NIC 703 connects to a chipset 719, which in turn connects to memory 705 for temporary storage of data, storage 717 for storage of data, a CPU 707 for processing commands and a power controller 715. The power controller 715 controls the power output of the power outlets 711 and the optional remote power outlets 713. The power controller 715 also manages the power input from the optional battery backup 709. The battery backup 709 provides electrical power when a primary power source does not. The power controller 715 switches the power outputs 711 between an enabled state, in which they may distribute electrical power, and a disabled state, in which distribution of electrical power is suspended. The power controller 715 transmits signals to the optional remote power outlets 713 to switch them between an enabled state, in which they conduct electricity between an electrical outlet and a connected device, and a disabled state, in which they do not conduct electricity between an electrical outlet and a connected device.

Figure 8:
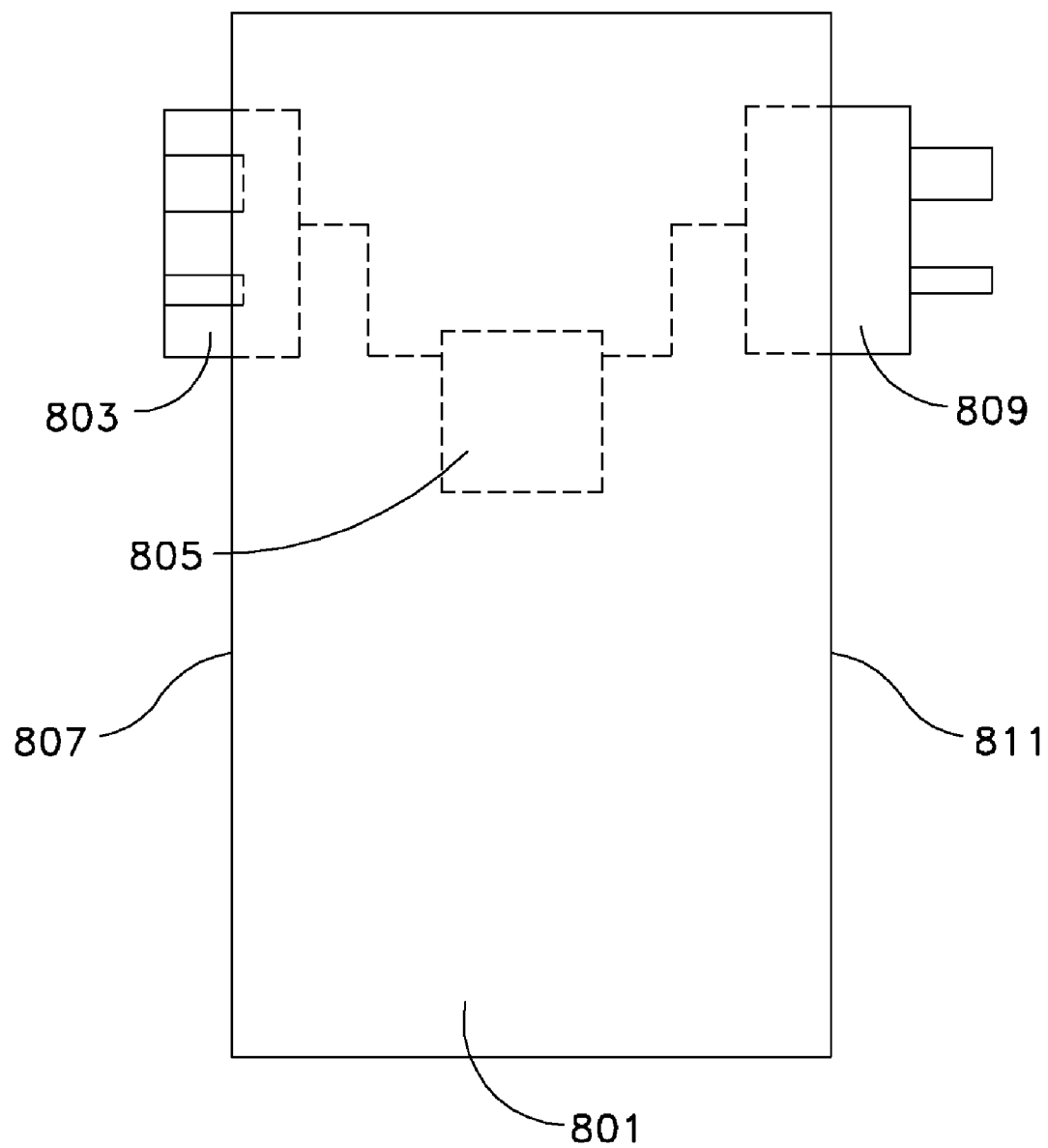
FIG. 8 illustrates a perspective view of the remote power outlet in accordance with some of the exemplary embodiments of the present invention.

FIG. 8 illustrates a cross-sectional view of the remote power outlet in accordance with some of the exemplary embodiments of the present invention. The remote power outlet 801 comprises a front surface 807 and a rear surface 811. Disposed upon the front surface 807 is an outlet 803. The outlet 803 is conductively connected to a control unit 805. The control unit 805 is also conductively connected to the plug 809. The plug 809 is disposed upon the rear surface 811. The control unit 805 switchably controls the electrical conductivity between the plug 809 and the outlet 803. The outlet 803 is compatible with any of a number of power interface standards including, for example, the NEMA 5-15 standard for a typical US power outlet. The plug 809 is compatible with any of a number of power interface standards including, for example, the NEMA 5-15 standard for a typical US power plug.

The remote power outlet 801 may switch between an enabled state and a disabled state. Such switching may be responsive to a wireless signal received by control unit 805. While the remote power outlet 801 is in the enabled state, the control unit 805 permits electrical conductivity between the outlet 803 and the plug 809. While the remote power outlet 801 is in the disabled state, the control unit 805 does not permit electrical conductivity between the outlet 803 and the plug 809.

Other systems, methods, and/or products according to the above embodiments will be or become apparent to one of ordinary skill in the art upon review of the above description, the following drawings, and any further description. It is intended that all such additional systems, methods, and/or products be included within this description, be within the scope of the present invention, and be protected by the accompanying claims.

What is claimed is:

1. A system for resetting electrical power, comprising:
    a housing;
    a power input extending from the housing;
    one or more power outputs extending from the housing, the one or more power outputs distributing power while in an enabled state and suspending distribution of power while in a disabled state;
    a power cycler, responsive to a reset signal, switching the one or more power outputs to the disabled state for a set duration and restoring each of the one or more power outputs to the enabled state in a time-sequenced manner;
    a processor linked to a network controller, the network controller having a connection to a remote server, the processor monitoring the connection between the network controller and the remote server and, responsive to a failure of the connection, transmitting the reset signal;
    the processor further: generates a first timestamp and sends a ping message to the remote server via the network controller; generates a second timestamp responsive to receiving a reply message from the remote server via the network controller; compares the first timestamp to the second timestamp to determine a ping value; and compares the ping value against a pre-determined threshold and, responsive to the ping value exceeding the pre-determined threshold, detects the loss of connectivity of the computer network to the remote server; and
    the processor periodically sending a plurality of subsequent ping messages to the remote server via the network controller with a pre-determined frequency, the pre-determined frequency increasing responsive to the ping value exceeding the pre-determined threshold and decreasing responsive to the ping value not exceeding the pre-determined threshold.

2. The system for resetting electrical power of claim 1, wherein:
    the networked link is a wired networked link.

3. The system for resetting electrical power of claim 1, wherein:
    the networked link is a wireless networked link.

4. The system for resetting electrical power of claim 1, further comprising:
    a remote switchable outlet, the remote switchable outlet creating electrical conductivity between an electrical receptacle and an electronic device when in an enabled state and preventing electrical conductivity between the electrical receptacle and the electronic device when in a disabled state, the remote switchable outlet receiving a wireless signal and, responsive to the wireless signal, toggling between the enabled state and the disabled state.

5. The system for resetting electrical power of claim 1, further comprising:
    a status display disposed upon the housing, the status display displaying one or more status indicators.

6. The system for resetting electrical power of claim 5, wherein:
    the status display displays whether each of the one or more power outlets is in the enabled state or disabled state.

7. The system for resetting electrical power of claim 1, wherein:
    the power input is connected to a battery, the battery providing electrical power to the power input.

8. The system for resetting electrical power of claim 1, further comprising:
  a manual reset button extending from the housing, the manual reset button transmitting the reset signal.

9. The system for resetting electrical power of claim 1, wherein:
  delaying for a duration of time pre-determined to match a first boot and configuration time of a first networking device, the first networking device receiving electrical power from the first output.

10. A method for power distribution, comprising:
  distributing electrical power at one or more power outputs;
  connecting to a computer network using a network interface controller;
  monitoring a computer network to evaluate connectivity of the computer network to a remote server; and
  initiating a power reset cycle responsive to detecting a loss of connectivity of the computer network to the remote server, the power reset cycle comprising the steps of:
    terminating electrical power at one or more power outputs for a set duration;
    terminating electrical power at one or more remote power switches for a set duration;
    restoring electrical power at each of the one or more power outputs and at each of the one or more remote power switches in a delayed sequence wherein each delay of the delayed sequence is of a set duration;
  generating a first timestamp and sending a ping message to the remote server via the network controller;
  generating a second timestamp responsive to receiving a reply message from the remote server via the network controller;
  comparing the first timestamp to the second timestamp to determine a ping value; and
  comparing the ping value against a pre-determined threshold and, responsive to the ping value exceeding the pre-determined threshold, detecting the loss of connectivity of the computer network to the remote server;
  periodically sending a plurality of subsequent ping messages to the remote server via the network controller with a pre-determined frequency, the pre-determined frequency increasing responsive to the ping value exceeding the pre-determined threshold and decreasing responsive to the ping value not exceeding the pre-determined threshold.

11. The method for power distribution of claim 10, further comprising:
  initiating a power reset cycle responsive to receiving a reset signal from a manual reset button.

12. The method for power distribution of claim 10, wherein:
  connecting to the computer network using the network interface controller includes connecting to a wireless computer network.

13. The method for power distribution of claim 10, further comprising:
  displaying a status on a display including displaying whether each of the one or more power outlets is in the enabled state or the disabled state.

14. The method for power distribution of claim 10, further comprising:
  receiving electrical power from a battery.

15. The method for power distribution of claim 10, further comprising the steps of:
  detecting a loss of connectivity of the computer network to the remote server within a pre-determined length of time since last initiating a power reset cycle;
  increasing the set duration of each delay of the delayed sequence.

16. The method for power distribution of claim 10, wherein the step of initiating a power reset cycle further comprises the steps of:
  restoring electrical power to a first output;
  delaying for a duration of time pre-determined to match a first boot and configuration time of a first networking device, the first networking device receiving electrical power from the first output;
  restoring electrical power to a second output;
  delaying for a duration of time pre-determined to match a second boot and configuration time of a second networking device, the second networking device receiving electrical power from the second output.

* * * * *